Jan. 26, 1937.  O. F. FARLEY  2,069,106
GAME
Filed Nov. 1, 1935  3 Sheets-Sheet 1

Inventor,
Owen F. Farley,
by Roberts Cushman & Woodberry
Attys

Jan. 26, 1937.                O. F. FARLEY                2,069,106
                                 GAME
                           Filed Nov. 1, 1935           3 Sheets-Sheet 2
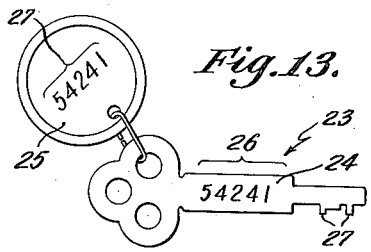
Fig. 13.
Fig. 14.  54242
Fig. 15.  54243
Fig. 16.  54244
Fig. 17.  54245
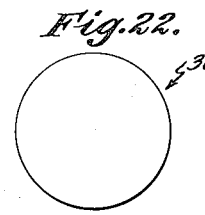
Fig. 22.
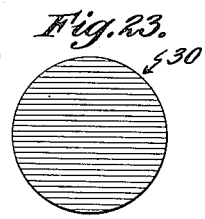
Fig. 23.
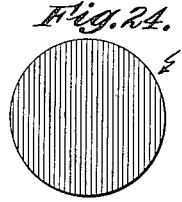
Fig. 24.
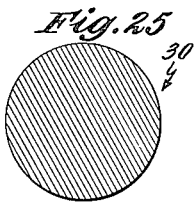
Fig. 25.
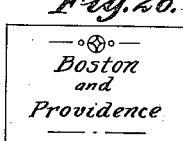
Fig. 26.  Boston and Providence
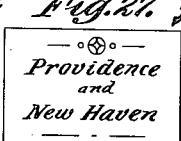
Fig. 27.  Providence and New Haven
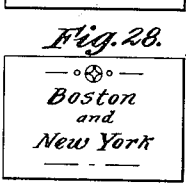
Fig. 28.  Boston and New York
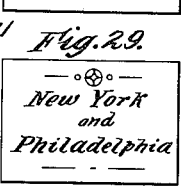
Fig. 29.  New York and Philadelphia
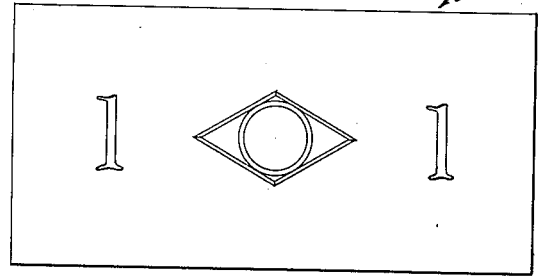
Fig. 18.
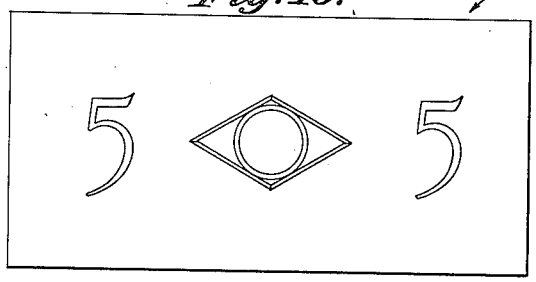
Fig. 19.
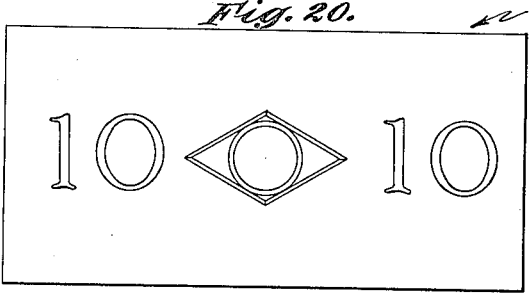
Fig. 20.
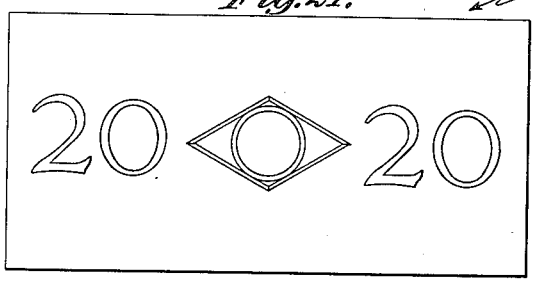
Fig. 21.
Inventor,
Owen F. Farley,
by Roberts Cushman & Woodberry
Attys.

Jan. 26, 1937. O. F. FARLEY 2,069,106
GAME
Filed Nov. 1, 1935 3 Sheets-Sheet 3

Inventor,
Owen F. Farley,
by Roberts Cushman & Woodberry
Attys.

Patented Jan. 26, 1937

2,069,106

UNITED STATES PATENT OFFICE 2,069,106

GAME

Owen F. Farley, Brookline, Mass.

Application November 1, 1935, Serial No. 47,791

4 Claims. (Cl. 273—136)

This invention pertains to games, especially to a game intended primarily for indoor use, and relates more particularly to apparatus and appliances designed to afford an interesting, instructive and amusing diversion to any desired number of persons. The game is played with the assistance of a game board, a set of tokens, whose principal purpose is selectively to determine which particular players from out the entire group playing are entitled to participate in any given round of play, and a series of certificates-of-value which, in association with the game board, determine the points scored or the gains made by each player taking part in any given round of play.

As herein specifically illustrated, as an example only and not by way of limitation, the game is geographical in character, the object of each player being that he may be first, in play, to reach a certain specific goal, for example, a city at a considerable distance from the starting place or "home",—the distance which he is entitled to travel toward his destination at each round of play in which he participates being governed by the certificate-of-value which he receives during each such round of play. In a preferred embodiment, one player at the end of each round may be entitled to a bonus (added mileage, for example), dependent upon the presence or absence of certain predetermined characteristics upon the token which entitled him to participate in such round of play. When the game is to be played as a travel or geographical game, it may be desirable to include a road map with the other appliances; however, since road maps are so commonly available for automobile use, and particularly as distances may be fixed arbitrarily by the players before commencing the play, the inclusion of such a map as a part of the game apparatus is not essential.

When applied as a travel game, the several certificates-of-merit or value may represent mileages. For example, one certificate may have the value of one mile, another five miles, another ten miles, etc. Alternatively, these certificates may take the form of railway or bus tickets entitling the holder to go from one town to another along a selected travel route, each certificate preferably, though not necessarily, having a value different from that of any other. As above stated, the game is not necessarily limited to travel, and the certificates-of-value may be in terms of any other desired unit. For example, if the game were to be played at a birthday party, the certificates-of-value or merit might take the form of prizes having actual intrinsic value or desirability, but obviously, whatever the character of the certificates-of-value, the ultimate goal of each player is to accumulate as great a number of the selected units as possible during the progress of the game.

For determining which players of the entire group shall be entitled to participate in any given round of the game, tokens are provided, each preferably bearing a distinguishing symbol, for example a number, different from that on any other token, each such number (if such be used) preferably consisting of four or more digits. Preferably this number or other symbol appears on each token at two spaced points, and provision is made whereby the token may be readily separated into two parts, each part bearing one of the duplicate symbols. While numbers may thus be employed, other designating characteristics may be substituted therefor, for example, spots in distinctive groupings or colors, distinctive pictures or characters, words or other arrangements of letters, differently shaped openings or contours of the token parts, or differently located openings or the like. Moreover, although duplication of the distinctive symbol or characteristic upon each token is desirable, it is contemplated that each token may have but one such distinguishing characteristic,—the players then being required either to remember their particular token symbol or to make a memorandum of the same at the inception of each round of play.

In the accompanying drawings certain desirable embodiments of the invention have been illustrated by way of example but without intent thereby to limit the scope of the invention, and in the drawings.

Figure 1:
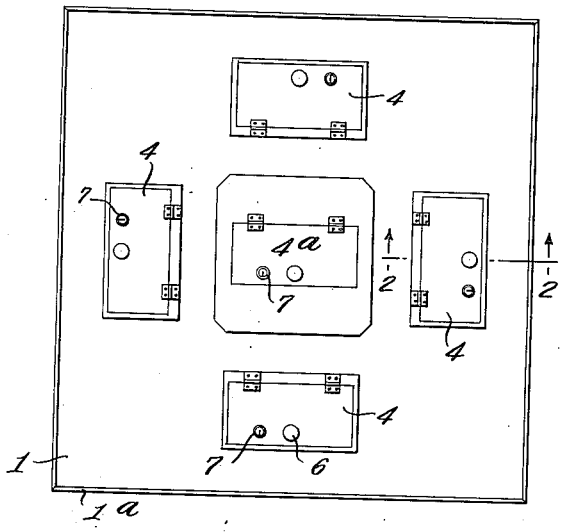
Fig. 1 is a plan view, to small scale, of a game board useful in playing the game of the present invention.
Figure 2:
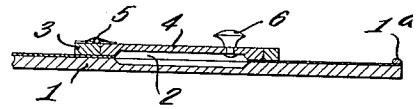
Fig. 2 is a fragmentary section, to enlarged scale, substantially on the line 2—2 of Fig. 1.
Figure 3A:
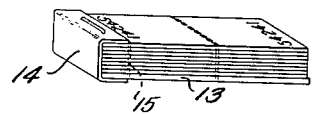
Figs. 3, 4, 5, 6 and 7 are plan views illustrating a series of player-selecting tokens in accordance with one embodiment of the invention.
Figure 3:
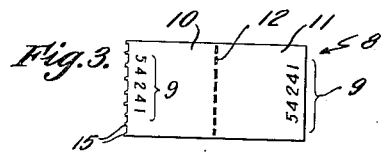
Figures 8, 9, 10:
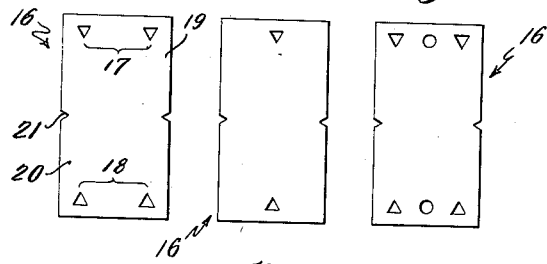
Figure 4:
Figure 5:
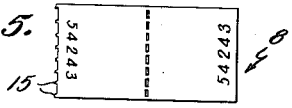
Figures 11, 12:
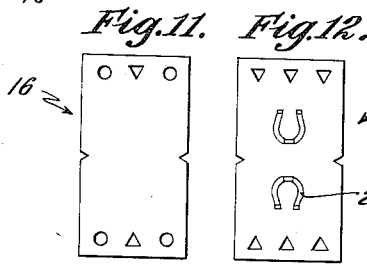
Figure 30:
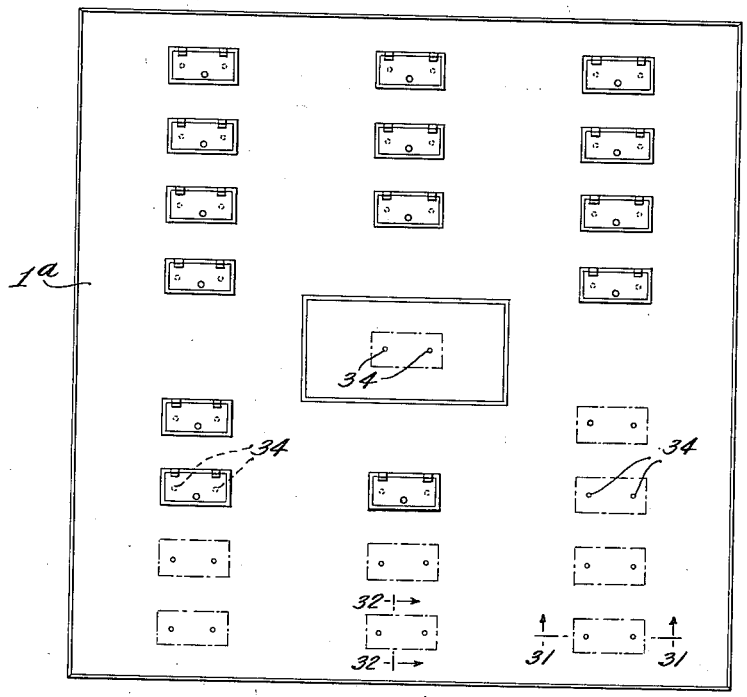
Figure 31:
Figure 32:
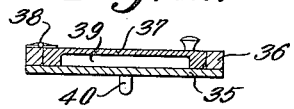
Figure 33:
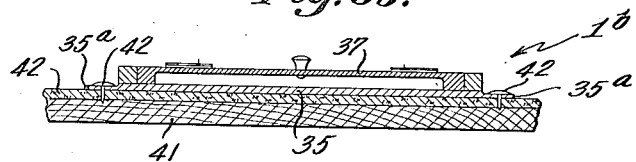

Fig. 3ª is a side elevation, partly in perspective, of a pad of detachable tokens of the type illustrated in Fig. 3;

Figs. 8, 9, 10, 11 and 12 are plan views, some of which are broken away, illustrating another type of player-selecting token;

Figs. 13, 14, 15, 16 and 17 are plan views illustrating another type of player-selecting token;

Figs. 18, 19, 20 and 21 are plan views illustrating one form of certificate-of-value useful with the game board of Figs. 1 and 2;

Figs. 22, 23, 24 and 25 are plan views of another form of certificate-of-value;

Figs. 26, 27, 28 and 29 are plan views of still another form of certificate-of-value;

Fig. 30 is a front elevation of a game board of modified construction designed to permit a maximum of twenty-two players to participate in a given round of the game;

Fig. 31 is a fragmentary section, to larger scale, on the line 31—31 of Fig. 30;

Fig. 32 is a transverse section of a removable receptacle useful with the game board of Fig. 31; and Fig. 33 is a section similar to Fig. 31, but illustrating a further modification showing a receptacle, in section, removably attached to the board by means of thumb tacks.

Referring to the drawings, the numeral 1 (Figs. 1 and 2) designates a game board of a desirable type, such board being made of any suitable material, for example, wood, indurated fiber, metal, or the like, and provided, if desired, with an ornamental covering and an edge moulding 1ª. As illustrated, this board 1 is furnished with four shallow cavities, each constituting the bottom of a playing receptacle 2. Surrounding each cavity is a rim or ledge 3 to which is hinged the movable opaque closure member or flap 4. Preferably the hinge 5 is a spring hinge which tends to return the closure member or flap to closed position. Each closure member may be furnished, if desired, with a knob 6 or other convenient device whereby the player may open the receptacle and with means for keeping the closure shut, for example a key-actuated lock 7. As illustrated, the cover 4 is recessed at its inner surface, and this recess, together with the cavity in the board with which the recess registers, forms the shallow chamber or receptacle 2 in which may be placed the certificate-of-value as hereinafter more fully described. Obviously, the chambered receptacle may be made in other ways and of any desirable material, for example cardboard, thin metal, paper, etc., provided, however, that it furnishes an accessible properly dimensioned chamber for the temporary concealment of a certificate-of-value.

As illustrated in Fig. 1, the playing receptacles are preferably distributed symmetrically with respect to the center of the board, and at the center is another receptacle of similar character (having the movable closure 4ª), this central receptacle for convenience being hereinafter referred to as a "bonus" receptacle. This central receptacle may be used or not, as desired, in playing the game, and, if preferred, it may be omitted entirely.

Referring to Figs. 3 to 7, the numeral 8 designates a token designed for use in selecting those particular players (from out the entire group) who shall be entitled to play in any given round of the game. These tokens 8 may be of any suitable material, for example thin celluloid, cardboard, paper, or the like, but preferably are of some material which is cheap enough so that they may be discarded after one use. Each of these tokens, as illustrated in Figs. 3 to 7, is provided, at two spaced points, with a distinguishing symbol or characteristic, for example a number, as indicated at 9, such number comprising a selected permutation of numerals chosen from the series 0–9, such numerals exemplifying any series of unlike index elements. These numbers or permutations upon different portions of each individual token are alike and may be placed, for example, on the opposite end portions 10 and 11, respectively, of the token, such portions being separable from each other as, for example, by tearing the token at its mid-portion. To facilitate such tearing, particularly if the token be of material which is not easily torn, a line of perforations 12, incision, or other device for weakening the token at its mid-portion may be employed.

As will be noted from inspection of Figs. 3 to 7, inclusive, the symbols or permutations on the several tokens are different; for example, a set of tokens may be numbered serially, it being preferred to employ numbers using at least four digits for a reason hereafter explained.

One convenient mode of supplying the tokens for use by the players is to arrange them in the form of a pad, as illustrated in Fig. 3ª, such pad comprising a stiff back 13, for example of heavy cardboard, to which the tokens are attached by means of a binder 14 and from which they may be detached by tearing them along the line 15 so as to free them from a stub which forms a permanent part of the pad. Obviously the tokens may be furnished to the players in some other convenient form, for example, wholly separate and in convenient packs, boxes, or other containers, or they may be provided in the form of a continuous strip from which they may be separated by tearing or cutting, as desired.

Figure 6:
Figure 7:

As above referred to, it is preferred, when using permutations of numerals as the distinguishing symbols, to employ symbols or permutations having more than four digits. Thus when the symbols are serially arranged upon a set of tokens, it will be evident that occasionally one of the tokens will have three or even four digits alike, as is shown for example on the token 8ª (Fig. 6).

In Figs. 8 to 12, tokens of a modified construction are illustrated, such tokens 16 being somewhat similar to those illustrated in Figs. 3 to 7 inclusive, but being provided with distinguishing symbols consisting of various permutations of distinguishable index elements, for example differently shaped openings 17, 18 at their opposite ends. The symbol upon any given token of the set is duplicated at its opposite end portions 19 and 20, respectively, and the token may, if desired, be weakened at its center part as, for example, by notches 21 at its opposite edges to permit it to be torn or otherwise separated into two portions each carrying its particular symbol. The symbols or permutations of index elements upon the several tokens of the set are different, as illustrated in Figs. 8 to 12, inclusive, but one token at least of the set may be furnished with an additional indication, as shown at 22 (Fig. 12) for a purpose hereinafter described.

In Figs. 13 to 17 a further arrangement of tokens is suggested, wherein each token comprises a key portion 24 and a tag portion 25, such portions being separably united as by means of a snap hook, and each bearing a like distinguishing symbol or permutation of index elements, such for example as the number shown at 26 and 27, respectively. The several tokens, in accordance with this variation, are made of metal or some rigid material, it being understood that each token of the set will bear a different symbol, for example, a different serial number. Each key portion of the tokens of this set is provided with wards 27 adapted to be used in unlocking a lock 7 provided in the closure 4 of each of the playing receptacles. As illustrated, each key portion of the set is provided with wards of the same shape and arrangement so that each key portion will unlock any of the playing receptacles. However, one of the tokens 23ª of the set has a key portion provided with an additional ward 28 whereby such key portion may be employed for unlocking the bonus receptacle as well, the lock of which can not be unlocked by any of the other key members of the set.

In addition to the set of tokens employed in playing the game, there will be furnished certificates-of-value, indicated, for example, at 29 (Figs. 18 to 21 inclusive). These certificates-of-value may be of any desirable material, such for example as paper, celluloid, metal, one of the synthetic resins, cardboard, or the like, each such certificate-of-value being of a size such that it may be readily placed within one of the receptacles of the game board and each such certificate-of-value bearing a character or other distinguishing feature indicating a certain number of units in accordance with the particular game being played.

Preferably these certificates-of-value will be of different values or denominations, respectively, for example, as illustrated in Figs. 18 and 19, wherein the certificate of Fig. 18 has a symbol at 30 indicating one unit, while the certificate of Fig. 19 has a symbol 31 indicating five units. As stated, these units may represent anything whatever in accordance with the type of game to be played. Thus if the game is a game of travel, as above suggested, the symbol 30 will indicate one mile, while the symbol 31 will indicate five miles, etc.

In Figs. 22 to 25 inclusive a modified type of certificate-of-value is illustrated wherein each certificate 30 consists of a disk of a more or less rigid material, for example, cardboard, metal, ivory, celluloid, or the like. These disk-like certificates-of-value, which for example may be poker chips, are distinguished one from another, for instance by color differences, or by having symbols or characters of various types impressed in or printed upon them, it being understood that the distinguishing colors or symbols will represent different values in the same way as do the symbols upon the certificates 29 previously described.

In Figs. 26 to 29 inclusive, certificates-of-value of further modified type are illustrated, such certificates 31 taking the form of railway tickets between designated points. Obviously certificates-of-value of other types may be used in accordance with the game which is to be played.

While the game board of Fig. 1 having the receptacles arranged to form an integral part thereof may be desirable, it is preferred that the game board be constructed so as to permit a greater or lesser number of playing receptacles to be used. Thus, for example, in Figs. 30 to 32 inclusive the game board 1ª is illustrated as comprising a substantially rigid back or supporting portion 32 of wood or the like, preferably having its front face covered with some soft and yielding material, such as a layer 33 of cork, felt, or the like. This board is furnished with series of pairs of sockets 34 at desired points, each pair of sockets being designed to hold a removable receptacle. As illustrated in Fig. 30, the board is arranged to hold any number of playing receptacles up to twenty-two and also to hold a bonus receptacle at its center, if desired.

As shown in Fig. 32, each receptacle comprises a back 35 having a rim 36 to which is hinged the closure member or flap 37 by means of the spring hinge 38, which normally keeps the closure member closed. The closure member is provided with a cavity in its rear face thereby to provide a receptacle 39 for the certificates-of-value, and the base or back member 35 of the receptacle has a pair of projecting pins 40 adapted to fit snugly but removably within the sockets 34 of the board. Receptacles may thus be placed upon the board in any number up to twenty-two to accommodate a greater or lesser number of players.

In the arrangement shown in Fig. 33 the board 1ᵇ comprises the back portion 41 having the facing 42 of cork or other suitable material adapted to give a soft and, if desired, ornamental finish, while each of the receptacles is generally similar to the receptacle shown in Fig. 32, comprising a back member 35 and a hinged closure 37. However, in this instance the back member 35 of the receptacle is furnished at opposite sides at least with flanges 35ª each having an opening through which may be projected a thumb tack 42 or other convenient fastening device. With this arrangement it is possible to place the receptacles at any desired part of the game board and to use a greater or lesser number to accommodate varying numbers of players.

*Mode of playing*

In playing the game, for example by means of the board and appliances illustrated in Figs. 1, 3 to 7, and 18 to 21, and assuming that a number of players greater than four is to engage in the game, a dealer is first chosen who may or may not be one of the players, as preferred. This dealer deals to each prospective player one of the tokens 8 in accordance with any mode or procedure previously decided upon. Obviously the dealing of the tokens should be accomplished in such a manner as to avoid any possibility of favoritism, particularly if the game includes a bonus factor as hereinafter referred to. After the tokens have thus been dealt one to each player, one end portion of each token, for example the end 10, is torn off or otherwise separated from the end portion 11, and deposited in a suitable box or other receptacle,—each player retaining the other half 11 of his token for identification. As above suggested, somewhat similar results might be obtained were each token to comprise but one repeat of its identifying number or other characteristic, in which event each player (or someone else designated for the purpose), after receiving his token, would make note of the identifying character thereon and then deposit the entire token in the box.

After the tokens or portions of tokens have thus been deposited in the box, and the box has been shaken or its contents stirred to ensure fair play, one of the players (or some person not playing, if preferred) is designated to draw out from the box, one after another, tokens or token parts corresponding in number to the number of playing receptacles on the board, for instance four, as disclosed in Fig. 1. If desired, the person doing this drawing may be blindfolded to ensure fairness, although this may not ordinarily be considered necessary. As each token or token part is drawn from the box, its identifying character or symbol may be read or exhibited and the player who has the corresponding token portion or symbol is thereby identified and qualified to play during the first round of the game. All players whose tokens are not so drawn from the box are excluded from this particular round.

At some time prior to the actual beginning of the first round, preferably, though not necessarily, before the tokens are dealt, a designated person, for example the dealer, aforesaid, or some other person not playing, or if preferred one of the players eliminated in the token drawing, is delegated to place in each of the receptacles 2 of the board one or more of the certificates-of-value 29. In thus depositing the certificates-of-value, the depositor may place certificates of the same or of different value in the several receptacles or combinations of several certificates of predetermined aggregate worth in one receptacle if desired, or may leave some receptacles entirely empty if he so chose. However, the depositor is expected to use care in placing the certificates in the receptacles in order that other players may not know what is put into each receptacle. Likewise he should use care in closing the receptacles so that the contents or lack of contents will not be discernible to the players.

Assuming that the certificates have thus been deposited, and that the players for the first round have been selected, each such player is permitted, in turn, to choose one of the receptacles and to remove the contents therefrom. The order in which the players make their choice may be that in which their tokens were drawn from the box, or may be in accordance with some other agreed upon arrangement, for example, in accordance with the serial numbers on their tokens. As each player, in turn, opens his chosen receptacle, he may, if desired, be called upon to exhibit the result of his choice, and if the receptacle which he has voluntarily chosen proves to be empty or to contain a certificate of low value, his discomfiture is, under usual circumstances, the occasion of harmless mirth and bandiage on the part of the other players, thus adding to the general enjoyment of the game.

The certificates thus secured from the receptacle may be retained by the several players, if desired. At the end of the game, the holdings of each player may be added to determine the ultimate result. Alternatively, their values may be noted to the account of each player or applied to his advancement and the certificates returned to the common lot for use in playing another round. After each round has been played, tokens are again dealt, and a new complement of players thus selected for the ensuing round, etc., the game being played through as many rounds as may be desired.

When the bonus feature is to be employed, the central bonus receptacle having the cover 4a (Fig. 1) is used. Into this receptacle, prior to each round of the game, is placed one or more certificates-of-value of a predetermined aggregate worth, and of any of the types above referred to, for example one of comparatively high value as compared with those usually deposited in the playing receptacles. This first deposit may remain in the bonus receptacle until won by one of the players or, if preferred, an additional deposit of like or other value may be put into the bonus receptacle preliminary to each round, until eventually some player becomes entitled to the entire contents of the bonus receptacle.

When using the bonus receptacle, the players that are accepted in any particular drawing of tokens examine their tokens to determine whether they are entitled to open the bonus receptacle. If, as suggested, the identifying character of a token consist of a number of four or more digits, and if the numbers be in consecutive series, there will be a token, at certain intervals, which will have several digits, for example three, all of like value. Thus the number on the token 8a (Fig. 6) includes three repeats of the digit 4. Such a triple repeat of a predetermined digit, for instance, the three right-hand digits being all alike, or the arrangement of certain selected figures in any predetermined order may, in accordance with the wishes of the players, be considered as entitling the holder of the token bearing such peculiar arrangement (if as the result of the drawing he is in fact entitled to take part in a given round of the game) to open the bonus receptacle and possess himself of its contents. Since it is possible that the holder of a bonus-entitling token may not be drawn to participate during several successive rounds of the game, the bonus receptacle, if supplied with an additional certificate preliminary to each round, may thus present the player who ultimately obtains access to it with a very considerable accumulation of units of value and to enhance the interest, the aggregate value of the contents of the bonus receptacle may be made known to the players at the inception of each round of play.

When the game is to be played as a travel game, as previously suggested, the players may first select a certain route, by rail or road, to be followed from a selected starting point, "home", to some predetermined distant point. Then as each player receives a certificate-of-value, he is entitled to measure off along the road from home a number of miles corresponding to the unit value of his certificate. When he plays again, his next certificate will entitle him to proceed from his last stopping point along the road a further distance, as shown by his second certificate, etc.;—the player first reaching the ultimate goal being the winner. It is clear that the player who secures a considerable bonus may greatly outdistance his competitors in any one round.

Obviously, if desired, penalty certificates may be employed, having thereon minus values. Thus, for example, in playing the travel game, such a certificate would require that the player receiving it retrace his steps along the road to a distance corresponding to the number of units indicated on such certificate.

Instead of certificates-of-value merely indicative of a different number of units of a selected kind, certificates having arbitrary units may be employed, such, for example, as the units 31, each in the form of a railway ticket entitling the holder to travel between two definite points. In playing the travel game by the use of such tickets, it is clear that until a player receives a ticket from the starting point, he may be unable to make any start whatever, even though he may receive tickets between other points. Thus, if desired, the element of "trade" may enter the game, the holder of a ticket which is of no immediate value to him being willing to trade with another player for a ticket which will help him along the road.

As a further alternative, certificates in the form of counters 30, for example colored poker chips, metal disks or the like, may be employed as above suggested, in which event the color, material or symbol upon the disk will, in accordance with predetermined agreement, entitle the recipient to a corresponding number of units of whatever type are employed in the game; or, as above suggested, the certificates-of-value may have actual intrinsic worth or desirability, for example when the game is to be played at a birthday party, or the like.

When tokens 23 such as illustrated in Fig. 13 are used, the tokens are first dealt as above described, one to each player. The tag portion 25 of each token is then separated from the key portion and deposited in a box from which a certain number, corresponding to the number of playing receptacles on the board, is drawn. The players holding the correspondingly numbered key members are then entitled to use such keys to unlock any one of the receptacles on the board which the player may select, thereby permitting such player to secure the certificate-of-value from the selected receptacle. If any player whose number is thus drawn holds the special key 23ª, he may then open the bonus receptacle and possess himself of the contents of that receptacle also.

As illustrated in Fig. 13, all of the keys will unlock any playing receptacle so that any player to whom a key is awarded may choose the receptacle which he will open. However, as a variant, the keys may be made so as to unlock only certain of the playing receptacles so that even though a player is awarded a key in the token drawing, he may find that it does not fit any of the receptacle locks, thus depriving him of any award during that particular round and again subjecting him to ridicule from the other players.

The tokens shown in Figs. 8 to 12 differ principally from those of Figs. 3 to 7 in employing different arrangements of perforations as the distinguishing indicia, one out of the entire number of tokens being provided with a special index such as a horeshoe 22 (symbolical of good luck), which entitles the owner to open the bonus receptacle.

Other variations of the broad idea will doubtless occur to those skilled in the art and are to be regarded as within the purview of the invention as expressed in the appended claims.

I claim:

1. In a game of the kind in which each of a limited number of players, chosen by chance from the total number playing, is entitled in each round of play to participate and when so playing to make his choice from a number of concealed certificates-of-value, in combination, a support having a surface layer adapted to receive removable penetrating fasteners, a plurality of playing receptacles and a bonus receptacle, each of said receptacles having substantially opaque walls and an opaque movable closure defining a shallow chamber of suitable dimensions to receive one of the certificates-of-value employed in the game, means for normally holding the closures in closed position, and fastener means detachably uniting the receptacles to the support thereby permitting the number of receptacles upon the support to be varied at will in accordance with the number of persons taking part in any round of the game.

2. A game comprising in combination supporting means and a plurality of receptacles supported thereby and affording a playing field, fasteners removably securing the several receptacles to the supporting means, each receptacle having a substantially opaque, normally closed closure, each receptacle being of such internal dimensions as to receive and to hold in temporary concealment one or more certificates-of-value, and a series of normally united but separable player-selecting tokens to determine those players out of the entire number playing who may take part in any given round of play and thereby become entitled to choose and to open one of the receptacles and become possessor of its contents, said tokens being of thin, flexible material and being in number at least as great as the number of players, each token including parts separable from each other by tearing, each of said parts bearing an identical player-identifying permutation of index elements, the permutations of index elements upon the several tokens being unlike.

3. A game comprising in combination a board having a plurality of receptacles distributed thereover and affording a playing field, each receptacle having a substantially opaque, normally closed closure, one of said receptacles being designated by position or indicia so as to distinguish it from the others, said specially distinguished receptacle being a bonus receptacle designed and arranged to hold one or more certificates-of-value of predetermined aggregate worth, the other receptacles being playing receptacles each designed and arranged to hold one or more certificates-of-value of lesser aggregate worth, and a series of normally united but separable player-selecting tokens to determine those players out of the entire number playing who may be entitled to take part in a given round of play and thereby to possess themselves of the contents of such one of the receptacles as he may respectively choose, the tokens being of thin material capable of being torn and being in number at least as great as the number of players, each token including parts separable from each other by tearing, each such part of a given token bearing an identical player-identifying permutation of index elements, each such permutation comprising four or more index elements, the permutations upon the several tokens of the series being unlike, one of the tokens of the series bearing a permutation comprising three or more like index elements thereby entitling the holder, if selected to play, to possess himself of the contents of the bonus receptacle.

4. A game apparatus comprising in combination a board having a plurality of shallow, normally closed receptacles distributed thereover and affording a playing field, fastener means detachably uniting the receptacles to the board, one at least of said receptacles being especially designated as by position or indicia so as to distinguish it from the other receptacles, the apparatus having certificates-of-value for deposit in the several receptacles subject to withdrawal therefrom by selected players, and a set of tokens to determine which players out of the total number playing shall in any round of play be entitled to withdraw certificates from the receptacle, each token consisting of a piece of flexible material capable of being torn and provided with means for localizing a line of tear, each token having duplicate distinguishing characteristics arranged at opposite sides of such line of tear, the distinguishing characteristics of each token of the set being different, the distinguishing characteristics of one token of the set effecting the advantage to the holder of possessing himself of the contents of the specially designed receptacle.

OWEN F. FARLEY.